(12) United States Patent
Leder et al.

(10) Patent No.: US 11,693,128 B2
(45) Date of Patent: *Jul. 4, 2023

(54) GAMMA RAY AND NEUTRON DOSIMETER

(71) Applicant: THERMO FISHER SCIENTIFIC MESSTECHNIK GMBH, Erlangen (DE)

(72) Inventors: Erich Leder, Heroldsbach (DE); Michael Iwatschenko-Borho, Roettenbach (DE); Norbert Trost, Erlangen (DE); Reinhard Buchhold, Erlangen (DE)

(73) Assignee: THERMO FISHER SCIENTIFIC MESSTECHNIK GMBH, Erlangen (DE)

( * ) Notice: Subject to any disclaimer, the term of this patent is extended or adjusted under 35 U.S.C. 154(b) by 113 days.

This patent is subject to a terminal disclaimer.

(21) Appl. No.: 17/388,816

(22) Filed: Jul. 29, 2021

(65) Prior Publication Data

US 2021/0356606 A1 Nov. 18, 2021

Related U.S. Application Data

(63) Continuation of application No. 16/660,334, filed on Oct. 22, 2019, now Pat. No. 11,307,311.

(60) Provisional application No. 62/749,232, filed on Oct. 23, 2018.

(51) Int. Cl.
*G01T 1/02* (2006.01)
*G01T 3/06* (2006.01)

(52) U.S. Cl.
CPC ............. *G01T 1/023* (2013.01); *G01T 3/06* (2013.01)

(58) Field of Classification Search
CPC .................................. G01T 1/023; G01T 3/06
See application file for complete search history.

(56) References Cited

U.S. PATENT DOCUMENTS

| | | | |
|---|---|---|---|
| 5,905,262 | A | 5/1999 | Spanswick |
| 6,605,809 | B1 | 8/2003 | Engels et al. |
| 6,872,937 | B2 | 3/2005 | Williams et al. |
| 7,154,098 | B2 | 12/2006 | Clarke et al. |
| 7,186,987 | B1 | 3/2007 | Doty et al. |
| 7,365,333 | B1 | 4/2008 | Shah et al. |
| 7,544,928 | B2 | 6/2009 | Hassan et al. |
| 9,796,922 | B2 | 10/2017 | Menge et al. |

(Continued)

FOREIGN PATENT DOCUMENTS

| | | |
|---|---|---|
| CN | 102928867 A | 2/2013 |
| CN | 203037861 U | 7/2013 |

(Continued)

OTHER PUBLICATIONS

"Lithium Glass Scintillators", Saint-Gobain Ceramics & Plastics, Inc., Aug. 2016, 2 pages.

(Continued)

*Primary Examiner* — David P Porta
*Assistant Examiner* — Djura Malevic

(57) ABSTRACT

A dosimeter includes a housing and a printed circuit board positioned within the housing. A silicon photomultiplier is operably connected to the printed circuit board. A scintillator formed of Ce-activated lithium aluminosilicate glass is positioned on the silicon photomultiplier. An optical coupling is positioned between the scintillator and the silicon photomultiplier, and an optical reflector surrounds the scintillator.

26 Claims, 5 Drawing Sheets

(56) References Cited

U.S. PATENT DOCUMENTS

| | | |
|---|---|---|
| 10,203,421 B2 | 2/2019 | Dorenbos et al. |
| 2010/0033075 A1 | 2/2010 | Naum et al. |
| 2013/0334432 A1 | 12/2013 | Kahilainen et al. |
| 2014/0042309 A1 | 2/2014 | Yeh et al. |
| 2014/0166889 A1 | 6/2014 | Kang et al. |
| 2016/0051957 A1 | 2/2016 | Rossi et al. |
| 2016/0216381 A1 | 7/2016 | Nishihara et al. |
| 2017/0276807 A1 | 9/2017 | Nishihara |
| 2018/0172852 A1 | 6/2018 | Newman |
| 2018/0246229 A1 | 8/2018 | Preston et al. |
| 2018/0284299 A1 | 10/2018 | Crema et al. |

FOREIGN PATENT DOCUMENTS

| | | |
|---|---|---|
| CN | 107957589 A | 4/2018 |
| JP | 2006275602 A | 10/2006 |
| WO | WO-2009157115 A1 | 12/2009 |
| WO | WO-2013066882 A1 | 5/2013 |
| WO | WO-2015091283 A1 | 6/2015 |
| WO | WO-2015091540 A1 | 6/2015 |

OTHER PUBLICATIONS

PCT/EP2019/078912, International Preliminary Report on Patentability, dated May 6, 2021, 8 pages.
PCT/EP2019/078912, Search Report and Written Opinion, dated Jan. 24, 2020.

GAMMA RAY AND NEUTRON DOSIMETER

CROSS-REFERENCE TO RELATED APPLICATIONS

The present application is a continuation of U.S. patent application Ser. No. 16/660,334, filed Oct. 22, 2019, which claims the priority benefit from U.S. Patent Application Ser. No. 62/749,232, filed Oct. 23, 2018, which is hereby incorporated by reference herein in its entirety for all purposes.

FIELD

Aspects of this disclosure relate generally to a gamma ray and neutron dosimeter, and more particularly, to a gamma ray and neutron dosimeter using a solid-state scintillator of Ce-activated lithium aluminosilicate glass.

BACKGROUND

Gamma ray and neutron detectors or dosimeters are known for determining radiation levels in an environment, which is useful in helping to protecting users from exposure to such radiation. Gamma ray and neutron dosimeters exploit atomic or molecular excitation produced by radiation passing through a scintillation material. Subsequent de-excitation generates photons that can be measured to give an indication of the energy deposited in the dosimeter by the radiation.

A dosimeter includes scintillation material coupled to a photomultiplier. When the dosimeter is exposed to radiation, the scintillation material is excited, generating photons of visible light. This light then strikes the photomultiplier, which generates a signal that can be measured.

Known combination dosimeters used to measure both gamma rays and neutrons are often bulky, complicated to manufacture, and expensive. One exemplary combination dosimeter includes three pin diodes and three signal processing detector paths.

It would be desirable to provide a combined gamma ray and neutron dosimeter that reduces or overcomes some or all of the difficulties inherent in prior known devices. Particular objects and advantages will be apparent to those skilled in the art, that is, those who are knowledgeable or experienced in this field of technology, in view of the following disclosure and detailed description of certain embodiments.

SUMMARY

In accordance with a first aspect, a dosimeter may include a housing and a printed circuit board positioned within the housing. A silicon photomultiplier may be operably connected to the printed circuit board. A scintillator formed of Ce-activated lithium aluminosilicate glass may be positioned on the silicon photomultiplier. An optical coupling may be positioned between the scintillator and the silicon photomultiplier, and an optical reflector may surround the scintillator.

In accordance with another aspect, a dosimeter may include a housing formed of metal. A printed circuit board may be positioned within the housing, with a cable operably connected to the printed circuit board and configured to supply power to the printed circuit board and provide digital data communication with the printed circuit board. A silicon photomultiplier may be operably connected to the printed circuit board. A scintillator formed of Ce-activated lithium aluminosilicate glass may be positioned on the silicon photomultiplier. An optical coupling formed of glue may be positioned between the scintillator and the silicon photomultiplier. An optical reflector may surround the scintillator. A gadolinium filter may surround the scintillator and the photomultiplier.

In accordance with other aspects, a dosimeter system may include a computer network having a plurality of computing devices. Each of a plurality of dosimeters may include a housing, a printed circuit board positioned within the housing and configured to communicate with the computer network, and a silicon photomultiplier operably connected to the printed circuit board. A scintillator formed of Ce-activated lithium aluminosilicate glass may be positioned on the silicon photomultiplier. An optical coupling may be positioned between the scintillator and the silicon photomultiplier. An optical reflector may surround the scintillator. A plurality of repeaters may be configured to receive data from the dosimeters and transmit that data to the computer network.

These and additional features and advantages disclosed here will be further understood from the following detailed disclosure of certain embodiments, the drawings thereof, and from the claims.

BRIEF DESCRIPTION OF THE DRAWINGS

The foregoing and other features and advantages of the present embodiments will be more fully understood from the following detailed description of illustrative embodiments taken in conjunction with the accompanying drawings in which.

Figure 1:
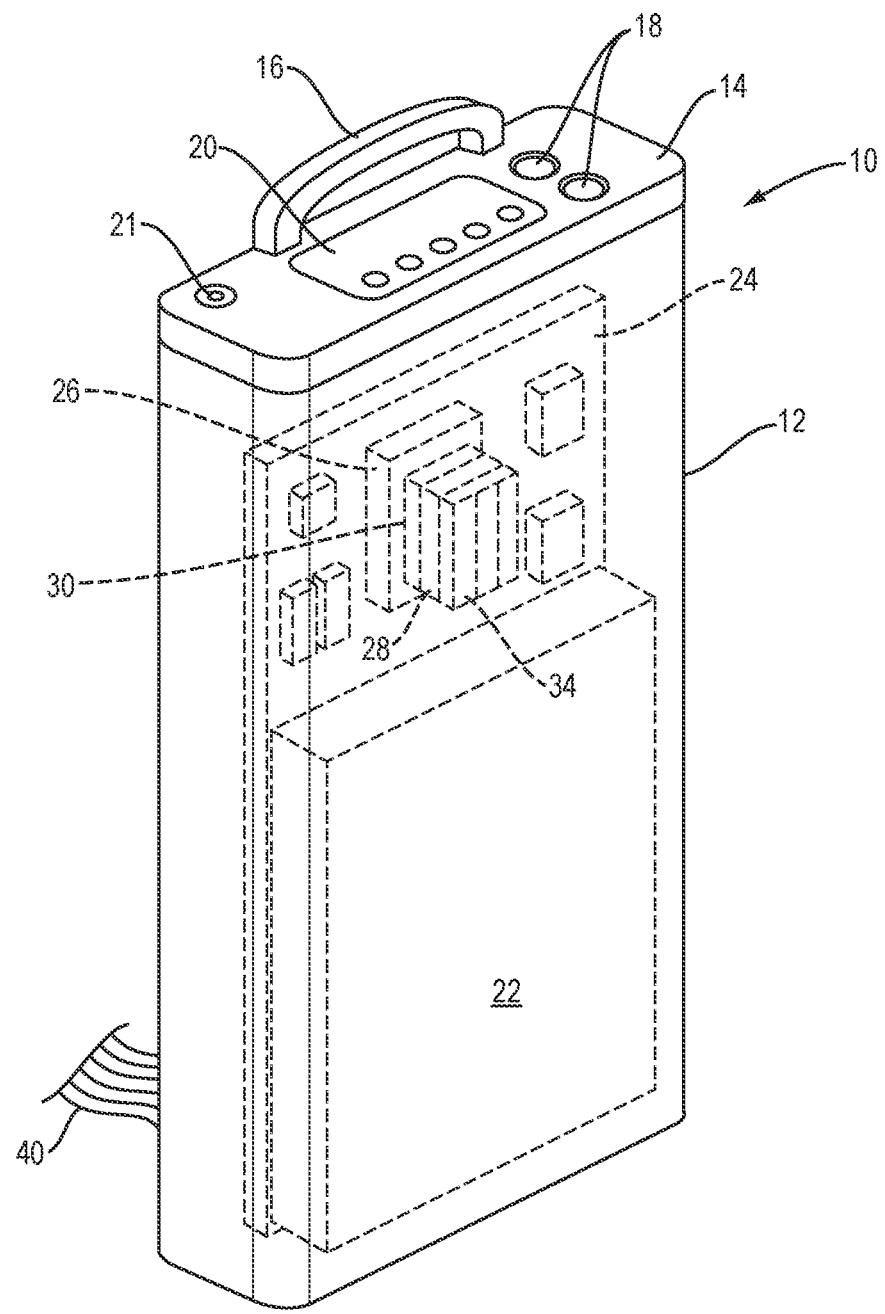
FIG. 1 is a perspective view of a combined gamma ray and neutron dosimeter.

The figures referred to above are not drawn necessarily to scale, should be understood to provide a representation of particular embodiments, and are merely conceptual in nature and illustrative of the principles involved. Some features of the gamma ray and neutron dosimeter depicted in the drawings have been enlarged or distorted relative to others to facilitate explanation and understanding. The same reference numbers are used in the drawings for similar or identical components and features shown in various alternative embodiments. Gamma ray and neutron dosimeters as disclosed herein would have configurations and components determined, in part, by the intended application and environment in which they are used.

DETAILED DESCRIPTION OF EMBODIMENTS

In the following description of various example structures in accordance with the disclosure, reference is made to the accompanying drawings, which form a part hereof, and in which are shown by way of illustration of various structures in accordance with the disclosure. Additionally, it is to be understood that other specific arrangements of parts and structures may be utilized, and structural and functional modifications may be made without departing from the scope of the present disclosure. Also, while spatial terms such as "top" and "bottom" and the like may be used in this specification to describe various example features and elements of the disclosure, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this disclosure.

Referring to FIG. 1, a combined gamma ray and neutron dosimeter 10 includes a housing 12. In certain embodiments, housing 12 is substantially light impermeable in order to prevent ambient light from affecting the performance of dosimeter 10, and may be formed of metal in some embodiments. For example, housing 12 may be formed of aluminum. Other suitable metals and materials for housing 12 will become readily apparent to those skilled in the art, given the benefit of this disclosure.

The term "substantially" as used herein is meant to mean mostly, or almost the same as, within the constraints of sensible, commercial engineering objectives, costs, manufacturing tolerances, and capabilities in the field of gamma ray and neutron dosimeter manufacturing and use. Similarly, the term "approximately" as used herein is meant to mean close to, or about, a particular value, within the constraints of sensible, commercial engineering objectives, costs, manufacturing tolerances, and capabilities in the field of gamma ray and neutron dosimeter manufacturing and use.

Housing 12 may include a cap 14 secured to a top of housing 12 that seals the components of dosimeter 10 within housing 12. Cap 14 may be secured to housing 12 with an epoxy, glue or other sealing material in order to provide protection from dust, water, moisture, or other contaminants for the components of dosimeter 10. In certain embodiments cap 14 is secured to housing 12 with a black epoxy, but may be secured by other means known in the art of portable ruggedized equipment. Cap 14 may also serve to reduce damage to dosimeter 10 from electrostatic discharge (ESD), and may provide electromagnetic interference (EMI) shielding.

Housing 12 may include a loop 16 so that dosimeter 10 can easily be attached by way of a clip to a user's belt, for example. Housing 12 is sized so as to be portable and conveniently carried by a user. Housing 12 may have a size similar to a pager. For example, housing 12 may have a width of approximately 85 mm, a width of approximately 65 mm, and a height of approximately 20 mm.

Cap 14 may be provided with indicator lights 18 that serve to notify the user of the status of dosimeter 10. A green indicator light 18 can serve to indicate that dosimeter 10 is functioning properly, while a red indicator light 18 can serve to indicate that there is a malfunction with dosimeter 10. Cap 14 may also include a touch sensor 20 and an associated cap printed circuit board (not shown) that provides electronic components that provided support for indicator lights 18 and touch sensor 20. Touch sensor 20 provides a way for the user to interact with dosimeter 10 in order to check the status, activate firmware updates, and communicate with other devices, for example.

Cap 14 may also be provided with a charging port 21 that allows for recharging of a battery 22 provided within housing 12. In certain embodiments, battery 22 is a single cell Lithium polymer (LiPo) battery providing approximately 500 mAh. Having a rechargeable battery provides portability and reliability for dosimeter 10.

A printed circuit board 24 is seated in housing 12. A photomultiplier 26 is operably connected to printed circuit board 24 in known fashion. In certain embodiments, photomultiplier 26 may be a Silicon (Si) photomultiplier. Printed circuit board 24 may house various electronic components including, for example, a temperature sensor, a microcontroller, an amplifier, a bias generator, and comparators, each of which works to process light signals transmitted by photomultiplier to provide a measurement of gamma ray and neutron radiation. Printed circuit board 24 includes communication capabilities that allow dosimeter 10 to communicate within a cloud computing network or other suitable networks as described in greater detail below. Other suitable components for printed circuit board 24 will become readily apparent to those of skill in the art, given the benefit of this disclosure.

A scintillator 28 is positioned adjacent photomultiplier 26. Scintillator 28 may be formed of Cerium (Ce)-activated lithium aluminosilicate glass. An exemplary scintillator is the 6-lithium enriched GS20® glass scintillator provided by Scintacor of Cambridge, United Kingdom. In the illustrated embodiment, scintillator 28 takes the form of a block of (Ce)-activated lithium aluminosilicate glass. As described in greater detail below, the scintillator may take other forms.

The term "adjacent" as used herein is meant to mean that two elements are next to, or nearby one another. In some embodiments two adjacent elements may be in contact with one another or spaced slightly apart from one another.

In certain embodiments, scintillator 26 is a cube having a width of approximately 3.7 mm, a length of approximately 3.7 mm, and a height of approximately 3.7 mm.

An optical coupling 30 may be positioned between scintillator 28 and photomultiplier 26. Optical coupling 30 serves to secure scintillator 28 and photomultiplier 26 to one another while allowing light from scintillator 28 to be transmitted to photomultiplier 26. In certain embodiments, optical coupling 30 may be achieved using a refractive index matching glue, such as those from Norland Products, Inc., or NTT Advanced Technology Corporation. In certain embodiments, optical coupling 30 has a refractive index that is approximately equal to a refractive index of scintillator 28.

In certain embodiments, a surface of scintillator 28 facing photomultiplier 26 (not visible here) may be polished in order to improve the optical contact between scintillator 28 and photomultiplier 26 and to avoid reflection of light that should be transmitted to photomultiplier 26. In certain embodiments, the remaining surfaces of scintillator 28 may be painted white in order to reflect light.

In the same or other embodiments, an optical reflector 34 may be positioned about and substantially surround the surfaces of scintillator 28, except for the surface of scintillator 28 facing photomultiplier 26. Optical reflector 34 serves to prevent light from being transmitted anywhere other than toward photomultiplier 26. Optical reflector 34 may be formed of polytetrafluoroethylene, for example. In certain embodiments, optical reflector 34 may be a tape wrapped in layers about scintillator 28. Optical reflector 34 may be 80 μm thick in certain embodiments. It is to be appreciated that optical reflector 34 may take on shapes other than a tape, such as a pre-formed can, dome, or conformal shape to scintillator 28, for example. Other suitable forms for optical reflector 34 will become readily apparent to those skilled in the art, given the benefit of this disclosure.

Printed circuit board 24 may include a cable 40, such as a flat cable, for example, that serves to provide power and data transmission to and from printed circuit board 24. In some embodiments, cable 40 operatively couples to printed circuit board 24 via a port opening in housing 12 (not shown), where cable 40 is detachable from printed circuit board 24. In some embodiments, cable 40 can be used during the manufacture, test, or upgrade process for dosimeter 10. Alternately, cable 40 can be used for direct transfer of data from dosimeter 10 to network 66.

Figure 2:
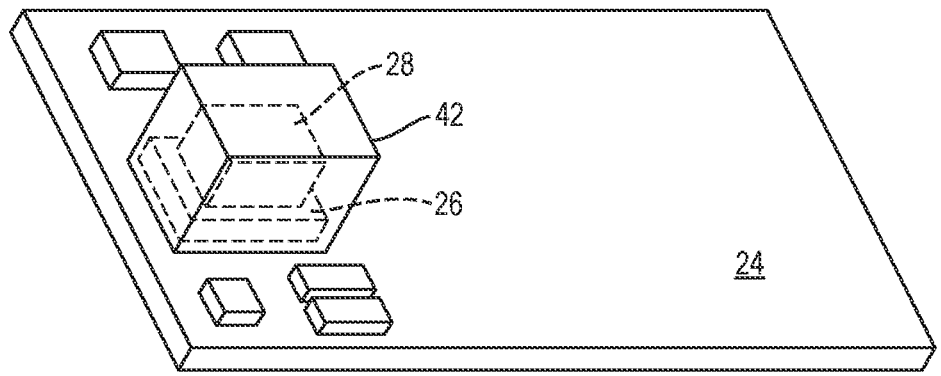
FIG. 2 is a perspective view of the scintillator and photomultiplier of the dosimeter of FIG. 1, shown with a filter.

In certain embodiments, as shown in FIG. 2, an energy filter 42 may be provided in dosimeter 10, which serves to help distinguish between the energy sources being detected, i.e., distinguishing between gamma rays and neutrons. Embodiments of energy filter 42 may be configured as a cube substantially surrounding scintillator 28, may be operatively coupled to circuit board 24, and may be formed of gadolinium. For example, energy filter 42 may substantially surround scintillator 28 and photomultiplier 26 (e.g. except for the surface of photomultiplier 26 coupled to circuit board 24). It will, however, be appreciated that filter 42 can be configured in a variety of possible shapes, such as a shape that may conform to the shape of scintillator 28 and/or optical reflector 34.

In embodiments that include energy filter 42, dosimeter 10 is effective in detecting both gamma rays and neutrons. The light pulses created by scintillator 28 are converted into electrical signals by photomultiplier 26 and then compared to reference signals in known fashion to provide accurate levels of the radiation detected.

In certain embodiments dosimeter 10 does not include energy filter 42. In such embodiments dosimeter 10 provides accurate levels of the gamma ray radiation, however, dosimeter 10 does not provide accurate levels of neutron radiation without energy filter 42. Neutrons tend to create a strong over-response, which provides an indication of the presence of neutrons, but not an accurate level of their presence. Thus, in such an embodiment, dosimeter 10 acts as an alarm for neutron radiation exposure, indicating to the user, and others, high levels of neutron exposure without specifying a numeric value for the neutron radiation level present. In such an embodiment, dosimeter 10 can produce an audible signal and/or vibration signal to indicate to the user a high level of neutron radiation, thereby providing a level of safety and security for the user.

Figure 3:
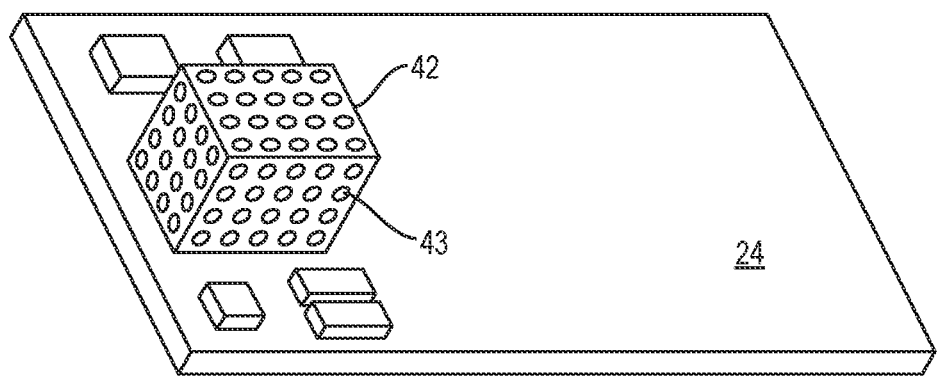
FIG. 3 is a perspective view of the scintillator and photomultiplier of the dosimeter of FIG. 1, shown with an alternative embodiment of a filter.

In certain embodiments, as shown in FIG. 3, energy filter 42 may include a plurality of apertures 43 that extend through energy filter 42. Apertures 43 may allow some low energy gamma ray radiation in to scintillator 28. Apertures 43 may be drilled through one or more of the surfaces of energy filter 42. In certain embodiments, apertures 43 are arranged in a matrix of rows and columns of apertures 43.

Figure 4:
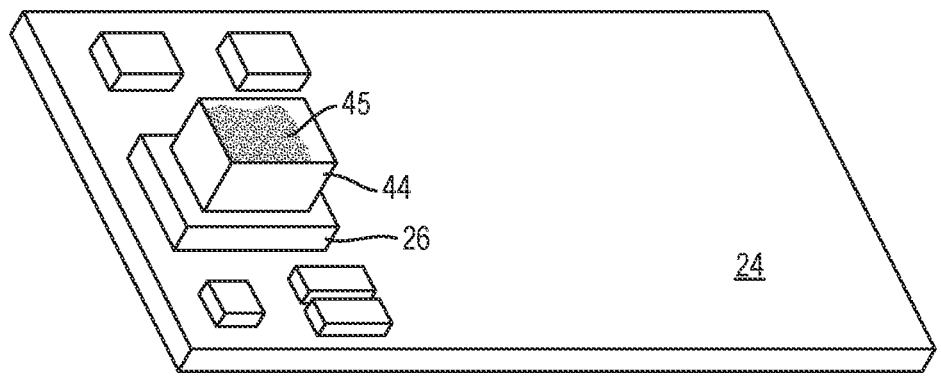
FIG. 4 is a perspective view of an alternative embodiment of the scintillator of the dosimeter of FIG. 1.

In certain other embodiments, scintillator 28 is not a pre-formed block of material, and may be formed in place directly on top of photomultiplier 26, as shown in FIG. 4. In certain embodiments, scintillator 28 is formed of a powder. In this embodiment, a container 44 with an open bottom and top is seated on photomultiplier 26. A powder 45 of Cerium (Ce)-activated lithium aluminosilicate glass that forms scintillator 28 is deposited within container 44 directly on top of photomultiplier 26. After powder 45 is deposited in container 44, an optical glue (not shown here) is deposited in container 44 and serves to fill the gaps between the particles of powder 45, secure the particles together, and secure the particles to photomultiplier 26. After powder 45 and the optical glue have set, container 44 can be removed and optical reflector 34 can be positioned on scintillator 28 as discussed above.

Figure 5:
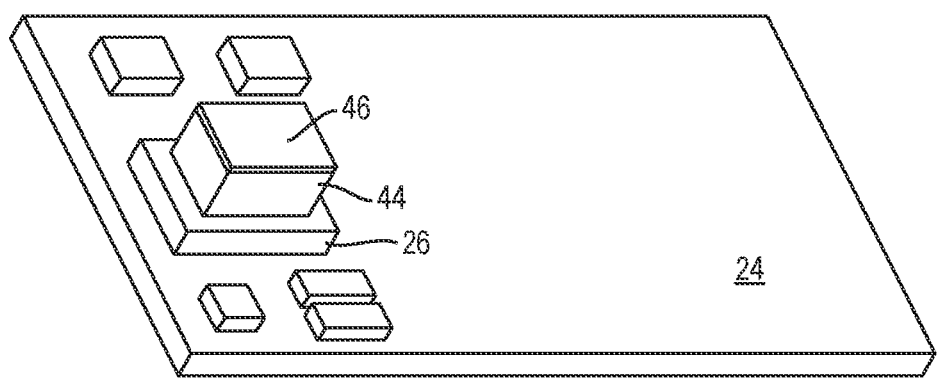
FIG. 5 is a perspective view of an alternative embodiment of the scintillator of the dosimeter of FIG. 4.

In other embodiments, as shown in FIG. 5, container 44 is not removed, and a cover 46 is secured to the open top of container 44. In such an embodiment, container 44 and cover 46 are formed of a reflective material, such as aluminum, DF2000MA (available from 3M), or Steinerfilm K (available from Steiner GmbH & Co KG), for example. In the presently described example, embodiments of container 44 and cover 46 formed of a reflective material act as an optical reflector in the same way as described above with respect to optical reflector 34.

It is to be appreciated that the small size of dosimeter 10 reduces the travel time for the photons within dosimeter 10, and reduces light losses. The smaller size provides for reduced reflections on the walls of scintillator 28. Additionally, the use of Ce-activated lithium aluminosilicate glass reduces the chances of afterglow after excitation with high gamma doses.

A Ce-activated lithium aluminosilicate glass scintillator provides the same pulse shape when excited by electrons or charged particles and, therefore, the distinction or discrimination between gammas and neutrons is done on the basis of pulse height rather than pulse shape.

The processing of the signal from dosimeter 10 is performed by way of semi-spectroscopic counter hardware or by a multi-channel analyzer (MCA) using a single signal path that uses pulse height analysis.

It is to be appreciated that in certain embodiments, a plurality of dosimeters 10 will be provided. For example, in a facility with a large number of workers and a potential for exposure to gamma ray or neutron radiation, each individual may be outfitted with their own dosimeter 10 when they are in environments with potential exposure to radiation. The small size and portability of dosimeter 10 makes such an implementation possible.

Additionally, in such a facility, a plurality of repeaters may be installed in particular locations. The repeaters can collect data from any nearby dosimeters 10 and forward that data to network 66 to help ensure that the data regarding radiation levels from dosimeters 10 gets transferred to the proper location. The repeaters and dosimeters 10 may be connected through network 66 so that real-time data regarding dose levels for all individuals can be provided and reviewed at multiple locations.

Figure 6:
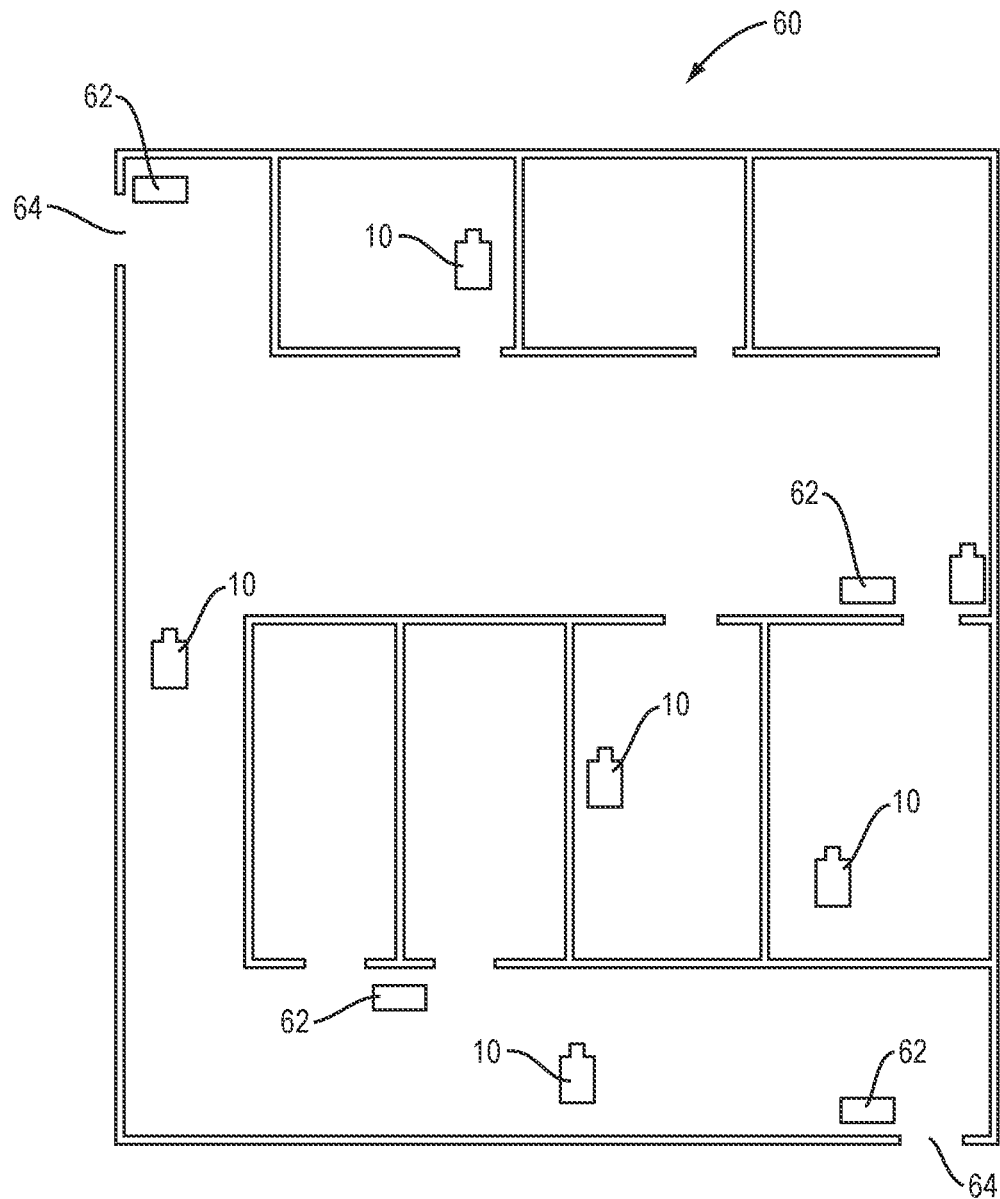
FIG. 6 is a schematic view of a facility including a plurality of the dosimeters of FIG. 1 and a plurality of repeaters.

As shown schematically in FIG. 6, a plurality of dosimeters 10 (carried by user's) are shown positioned throughout a facility 60. Facility 60 may be an individual building with rooms therein, as illustrated in FIG. 6. In other embodiments, facility 60 could include a plurality of buildings, and each of those buildings could have one or more rooms therein. In still other embodiments, facility 60 could be onboard a ship or other vessel where there is a need to monitor radiation dose levels.

In addition to dosimeters 10, a plurality of repeaters 62 may be located within facility 60 as well. As noted above, repeaters serve to collect radiation data transmitted by dosimeters 10 and forward this data. For example, repeaters 62 may be located at each entrance and exit 64 in facility 60 to ensure that readings of dose levels of individuals as they enter and exit facility 60 are transmitted to a computer network, as described below. Additionally, repeaters 62 may be located in high radiation areas where the risk of exposure is greater than in other areas of facility 60. These repeaters 62 provide an enhanced level of security and safety for the individuals within facility 60.

As the user moves throughout facility 60, the individual dosimeter 10 carried by the user can be used to track radiation levels for that user, which data can be used in a real-time basis to provide a warning to the user when a particular radiation level has been exceeded. The term "real-time" as used herein typically refers to reporting, depicting, or reacting to events at the same rate and sometimes at the same time as they unfold (e.g. within a few seconds or fractions of a second), rather than delaying a report or action. This data can also be viewed by others in remote locations through a computer network, described in greater detail below.

Figure 7:
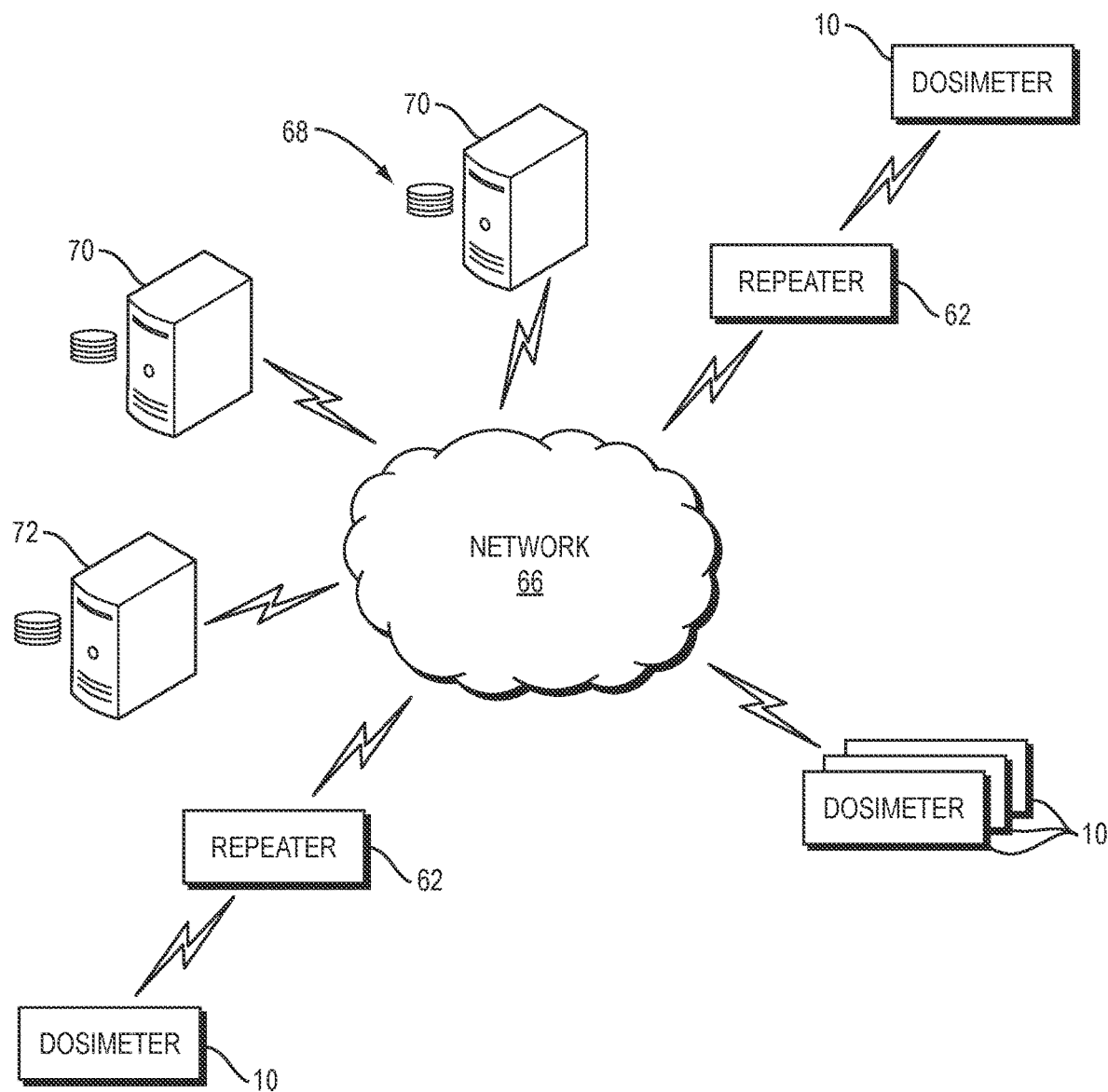
FIG. 7 is a schematic view of a network used in the facility of FIG. 6.

Dosimeters 10 and repeaters 62 may be connected to a computer network 66 in a cloud computing environment 68 as illustrated in FIG. 7. Cloud computing environment 68 may include one or more computing devices 70, each of which may include computing resources. In some embodiments, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each computing device 70 may be connected to any other computing device, any repeaters 62, and any dosimeter 10 in cloud computing environment 68 by way of computer network 66.

Cloud computing environment 68 may include a resource manager 72, which may be connected to computing devices 70 over computer network 66. In some implementations, resource manager 72 may facilitate the provision of computing resources by one or more computing devices 70 to one or more dosimeters 10 or repeaters 62. Resource manager 72 may receive a request for a computing resource from a particular dosimeter 10 or repeater 62. Resource manager 72 may identify one or more computing devices 70 capable of providing the computing resource requested by the dosimeter 10 or repeater 62. Resource manager 72 may facilitate a connection between a computing device 70 and a particular dosimeter 10 or repeater 62.

Computing devices 70 may any of various forms of digital computers, such as laptops, desktops, workstations, personal digital assistants, servers, blade servers, mainframes, and other appropriate computers. Computing devices 70 may also be any kind of mobile computing device such as personal digital assistants, cellular telephones, smartphones, and other similar computing devices. The components shown here, their connections and relationships, and their functions, are meant to be examples only, and are not meant to be limiting.

Computing devices 70 in known fashion may include a processor, a memory, a storage device, interfaces connecting to the memory and the storage device, and a display so that data regarding radiation exposure levels of the various users is visible to others. The processor can process instructions for execution within computing device 70, including instructions stored in the memory or on the storage device to display graphical information for a GUI on an external input/output device, such as a display. In other embodiments, multiple processors may be used, as appropriate, along with multiple memories and types of memory. Also, multiple computing devices may be connected, with each device providing portions of the necessary operations (e.g., as a server bank, a group of blade servers, or a multi-processor system).

[1] Computing devices 70, resource manager 72, dosimeters 10, and repeaters 62 may communicate wirelessly where necessary using various modes or protocols such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. In addition, short-range communication may occur, such as using a Bluetooth®, Wi-Fi™, or other such transceiver (not shown).

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above examples, but is encompassed by the following claims. All publications and patent applications cited above are incorporated by reference in their entirety for all purposes to the same extent as if each individual publication or patent application were specifically and individually indicated to be so incorporated by reference.

What is claimed is:

1. A dosimeter comprising:
    a housing;
    a printed circuit board positioned within the housing;
    a silicon photomultiplier operably connected to the printed circuit board;
    a scintillator formed of a glass powder and positioned on the silicon photomultiplier, wherein the scintillator comprises a glue distributed throughout the glass powder to secure particles together and to the silicon photomultiplier, and further wherein the distribution of the glue comprises an optical coupling between the scintillator and the silicon photomultiplier; and;
    an optical reflector surrounding the scintillator.

2. The dosimeter of claim 1, wherein the scintillator comprises a block form.

3. The dosimeter of claim 2, wherein a surface of the block form facing the silicon photomultiplier is polished.

4. The dosimeter of claim 2, wherein a plurality of surfaces of the block form are painted white.

5. The dosimeter of claim 1, wherein the optical reflector comprises a reflective container substantially surrounding the glass powder.

6. The dosimeter of claim 5, wherein the optical reflector comprises a reflective cap secured about an opening of the container.

7. The dosimeter of claim 1, wherein a refractive index of the glue is approximately equal to a refractive index of the scintillator.

8. The dosimeter of claim 1, wherein the optical reflector is formed of polytetrafluoroethylene.

9. The dosimeter of claim 1, wherein the optical reflector comprises a tape form.

10. The dosimeter of claim 1, wherein the housing is formed of aluminum.

11. The dosimeter of claim 1, further comprising a filter surrounding the scintillator and the silicon photomultiplier.

12. The dosimeter of claim 11, wherein the filter is formed of gadolinium.

13. The dosimeter of claim 11, wherein the filter includes a plurality of apertures extending therethrough.

14. The dosimeter of claim 1, wherein the housing is sealed with an epoxy sealant.

15. The dosimeter of claim 14, wherein the epoxy sealant is black.

16. The dosimeter of claim 1, further comprising a cable operably connected to the printed circuit board and configured to supply power to the printed circuit board and provide digital data communication with the printed circuit board.

17. A dosimeter system comprising:
a computer network including a plurality of computing devices;
a plurality of dosimeters, each dosimeter comprising:
  a housing;
  a printed circuit board positioned within the housing and configured to communicate with the computer network;
  a silicon photomultiplier operably connected to the printed circuit board;
  a scintillator formed of a glass powder and positioned on the silicon photomultiplier, wherein the scintillator comprises a glue distributed throughout the glass powder to secure particles together and to the silicon photomultiplier, and further wherein the distribution of the glue comprises an optical coupling between the scintillator and the silicon photomultiplier; and;
  an optical reflector surrounding the scintillator; and
a plurality of repeaters configured to receive data from the dosimeters and transmit that data to the computer network.

18. A method of forming a scintillator comprising:
seating a container with an open bottom on a photomultiplier;
depositing a glass powder within the container on top of the photomultiplier; and
depositing a glue in the container.

19. The method of claim 18, wherein:
the glue fills gaps between particles of the powder.

20. The method of claim 19, wherein:
the glue secures the particles together.

21. The method of claim 19, wherein:
the glue secures the particles to the photomultiplier.

22. The method of claim 19, further comprising:
removing the container; and
positioning an optical reflector on the scintillator.

23. The method of claim 18, further comprising:
securing a cover on top of the container.

24. The method of claim 23, wherein:
the cover comprises a reflective material.

25. The method of claim 24, wherein:
The reflective material comprises aluminum or Steiner-film K.

26. The method of claim 18, wherein:
the container comprises a reflective material.

* * * * *